United States Patent [19]
Kuwahara et al.

[11] Patent Number: 6,067,173
[45] Date of Patent: May 23, 2000

[54] FACSIMILE APPARATUS

[75] Inventors: Takuya Kuwahara, Yokohama; Masaki Nishioka, Tokyo, both of Japan

[73] Assignee: Matsushita Graphic Communication Systems, Inc., Tokyo, Japan

[21] Appl. No.: 09/046,561

[22] Filed: Mar. 24, 1998

[30] Foreign Application Priority Data

Apr. 10, 1997 [JP] Japan ..................................... 9-108114

[51] Int. Cl.[7] .................................................... H04N 1/04
[52] U.S. Cl. ............................................. 358/474; 358/400
[58] Field of Search .................................... 358/400, 474; 345/126; 382/297

[56] References Cited

FOREIGN PATENT DOCUMENTS 6124008  5/1994  Japan .

OTHER PUBLICATIONS

An English Language Abstract of JP 6–124008.

*Primary Examiner*—Kimberly A. Williams
*Assistant Examiner*—Derrick Fields
*Attorney, Agent, or Firm*—Greenblum & Bernstein P.L.C.

[57] ABSTRACT

A facsimile apparatus according to the present invention includes an operation member which is arranged horizontally and can be rotated, and a display which is arranged at the same level as the operation member and rotates a display image in accordance with the rotation of the operation member. In addition, the display displays letters, numbers, symbols and the like by rotating them electrically by 90 degrees when the operation member rotates by at least 45 degrees. And the operation member is arranged aside at the top level of the facsimile apparatus, with its circumference partially projecting from the edge of the apparatus. Furthermore, the facsimile apparatus is configured vertically, and the operation member and the display are arranged at the top level of the apparatus, between a paper feeding means and a paper ejecting means, each of which feeds or ejects paper in the direction crossing the top level of the apparatus at an obtuse angle.

15 Claims, 5 Drawing Sheets

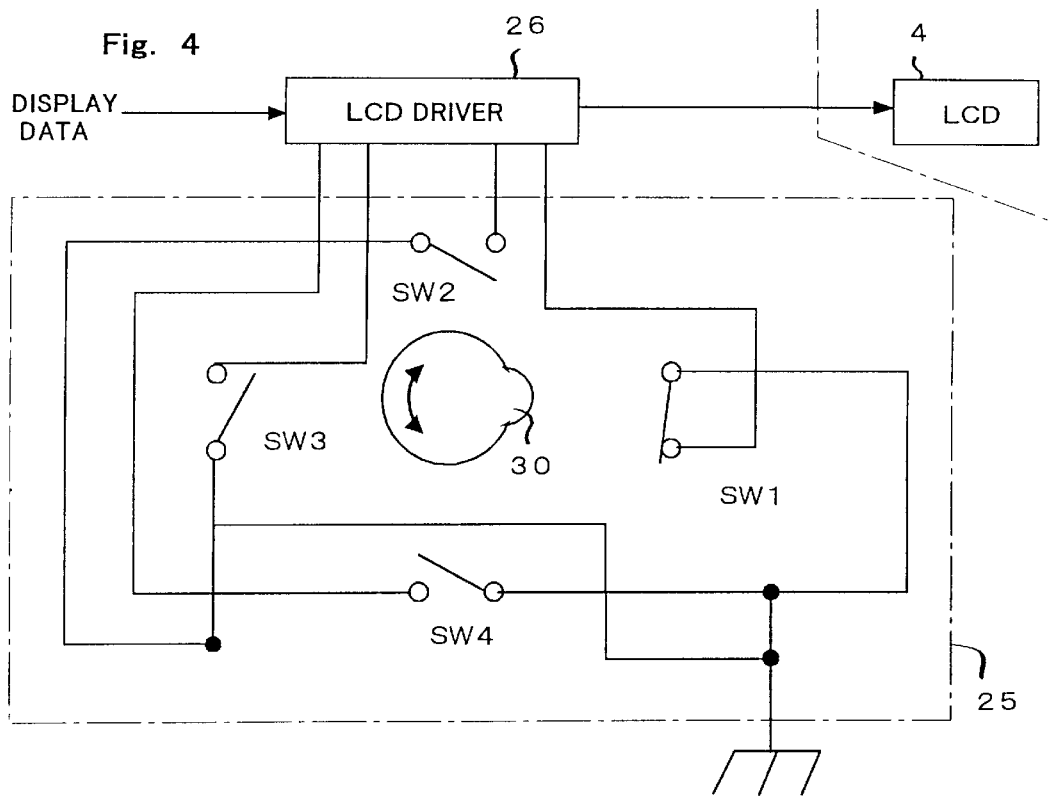
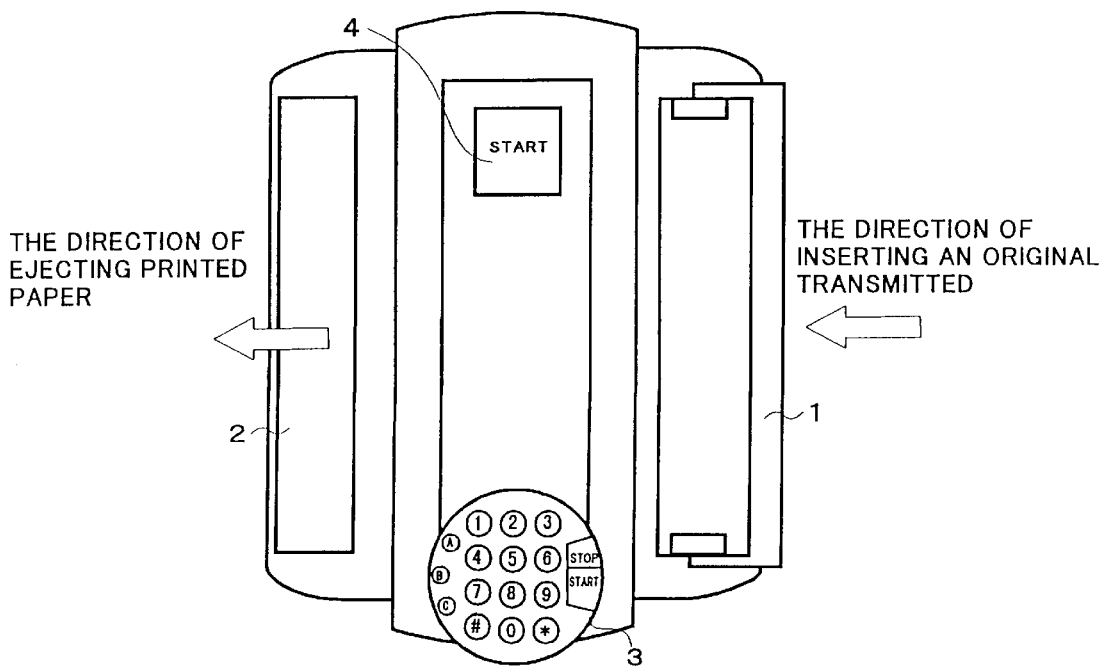

FACSIMILE APPARATUS

BACKGROUND OF THE INVENTION

1. Field of the Invention

The present invention relates to a facsimile apparatus whose operation portion can be rotated facing an operator, and which displays letters, numbers, symbols and the like by rotating them in accordance with the rotation of the operation portion.

2. Description of the Related Art

Heretofore, a facsimile apparatus is so designed that the horizontal direction it faces will be fixed. That is, its front side is supposed to face a user. Accordingly, the operation portion which includes numerical keys for inputting a phone number, start and stop keys, and a function selection key, is fixed to the apparatus, which obliges the user to stand facing the front side of the apparatus so that he can easily read the names of the keys. In this case, the user cannot make the apparatus face the arbitrary direction so that it will fit in the place where he wants to situate it, and hence the choice of where to situate it is restricted. This is inconvenient. Therefore, a facsimile apparatus whose operation portion can be horizontally rotated so that it can be used whichever direction it faces, is proposed.

For example, there is an electrophotography apparatus disclosed in Unexamined Japanese Patent Publication No. 6-124008. In the apparatus, its operation portion with numerical keys and a liquid crystal display can be rotated. Even if a user situates the apparatus with its front side aside, he can read the names of the keys and the display image regularly right to left.

In this case, however, the constitution will be complicated because the rotating operation portion includes a liquid crystal display as well as numerical keys and hence the number of rotating contact points transmitting signals increases. Furthermore, considering that more and more facsimile apparatuses are miniaturized now, it is difficult to enlarge the operational member, and hence both the numerical keys and the liquid crystal display are obliged to be small. This may cause the keys to be hard to press and the display image to be hard to read.

The present invention is made in view of the above-described subject and it is the object of the present invention to provide a facsimile apparatus whose operation portion and display are both conspicuous and which can be easily operated, regardless of which side a user stands on.

SUMMARY OF THE INVENTION

In order to achieve the above-described object, the present invention provides a facsimile apparatus comprising an operation member which is arranged horizontally and can be rotated, and a display member which is arranged at the same level as the operation member and rotates a display image in accordance with the rotation of the operation member.

Due to the above configuration, the apparatus is easier to operate because its operation panel and display member both face the operator regardless of which side he stands on.

BRIEF DESCRIPTION OF THE DRAWINGS

FIG. 4 is a block diagram showing the electrical constitution for changing the display image of the present facsimile apparatus, FIG. 5 is a top view of the present facsimile apparatus, in case of situating it with its rotating operation portion forward.

DETAILED DESCRIPTION OF THE PREFERRED EMBODIMENTS

A facsimile apparatus according to a preferred embodiment of the present invention will now be described in detail, with reference to the drawings.

Figure 1:
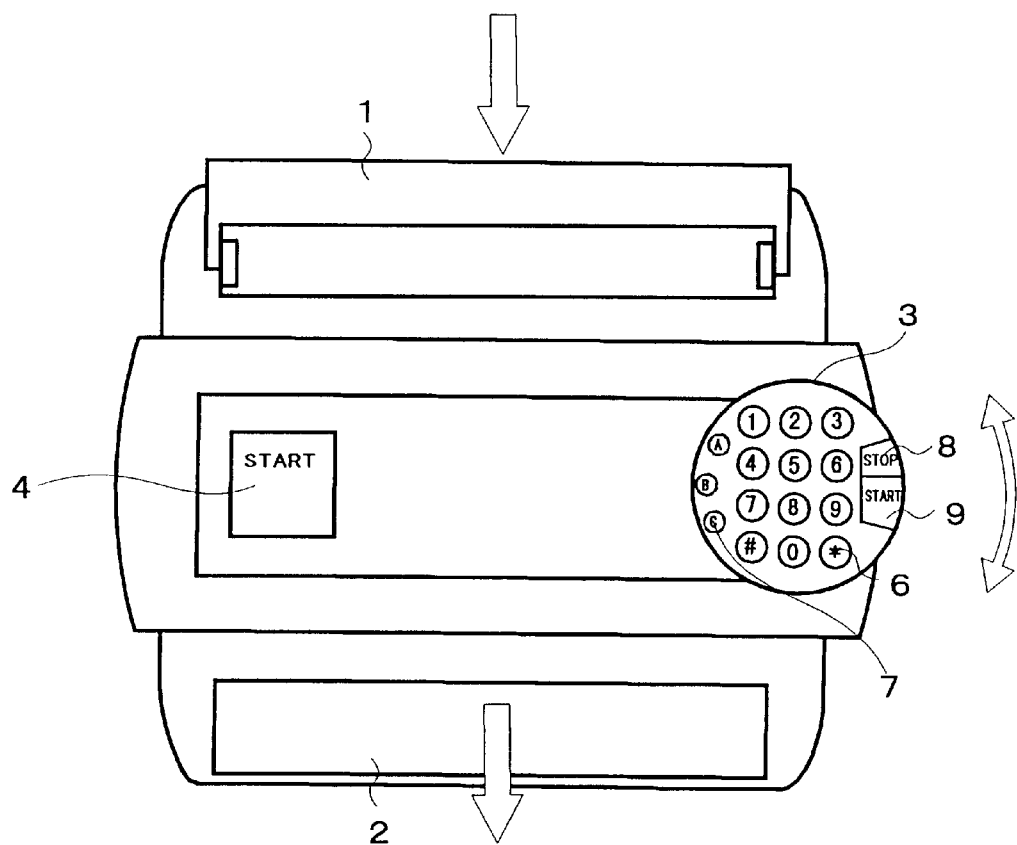
FIG. 1 is a top view of a facsimile apparatus according to a preferred embodiment of the present invention, in case of situating it with its rotating operation portion rightward.
Figure 2:
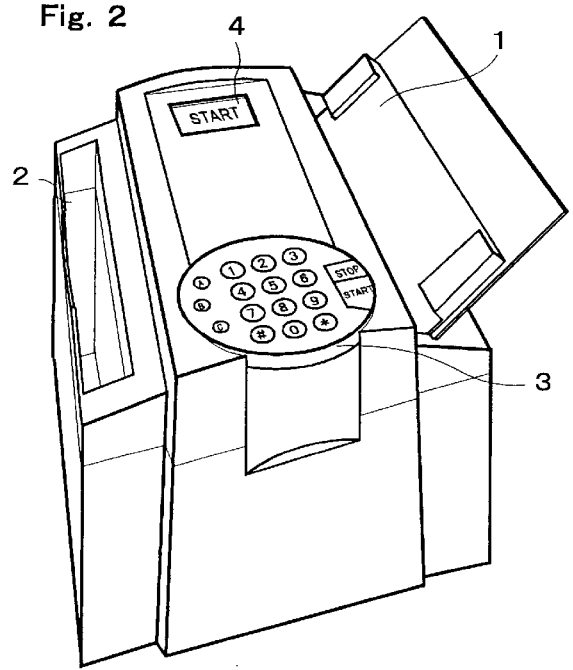
FIG. 2 is a perspective view showing the external configuration of the present facsimile apparatus.

FIG. 1 is a top view of a facsimile apparatus according to a preferred embodiment of the present invention, in case of situating it with its rotating operation portion which will be described later rightward, and FIG. 2 is a perspective view of the facsimile apparatus shown in FIG. 1.

In FIGS. 1 and 2, the facsimile apparatus has an insertion slot 1 on one side, into which to insert an original transmitted, and also has an ejection slot 2 on the opposite side, which is parallel to the insertion slot 1 and out of which printed paper is ejected. Besides, the facsimile apparatus has a rotating operation portion 3 in the right part in FIG. 1 of the panel between the insertion slot 1 and the ejection slot 2. The rotating operation portion 3 can be rotated as shown by the arrow in FIG. 1, by a user's finger or the like, and is settled in any position of every 90 degrees (0, 90, 180 or 270 degrees). Furthermore, the facsimile apparatus has a liquid crystal display 4 hereinafter referred to as LCD 4 in the left part in FIG. 1 of the panel between the insertion slot 1 and the ejection slot 2. The LCD 4 displays a phone number inputted, or a function selected, by the rotating operation portion 3. The rotating operation portion 3 has numerical keys 6 (0 to 9, * and #) for inputting a phone number, and also has function selection keys 7 (A, B and C) for selecting a certain function: for instance, memorizing phone numbers, pausing or the like. And besides, the facsimile apparatus has a stop key 8 which interrupts transmission, erases inputted data or the like, and also has a start key 9 which starts transmission.

Figure 3:
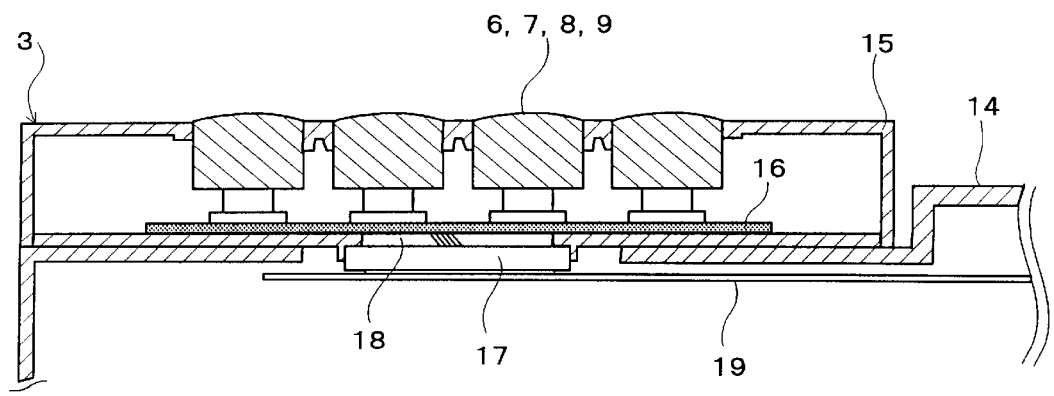
FIG. 3 is a sectional view showing the constitution of the rotating operation portion of the present facsimile apparatus.

FIG. 3 is a sectional view showing the constitution of the rotating operation portion 3 in FIG. 1. In FIG. 3, the rotating operation portion 3 is swiveled to an outer casing 14, and has a hollow rotor 15 whose vertical section is rectangular. On the hollow rotor 15 are numerical keys 6, function selection keys 7, a stop key 8 and a start key 9, whose contact points are on a circuit substrate 16. The hollow rotor 15 is retained by a retaining member 17 so that it can be rotated, and between the retaining member 17 and the circuit substrate 16 is a rotating contact point 18. The retaining member 17 is on a circuit substrate 19 such as a mother board, and a wiring pattern which is not shown in the figure and the rotating contact point 18 are connected to it.

In addition, on the retaining member 17 is a detection member as shown later in FIG. 4 for detecting the position of the rotating operation portion 3, that is, detecting in which position of every 90 degrees (0, 90, 180 or 270 degrees) it is settled.

FIG. 4 is a block diagram showing the electrical constitution for changing the display image. In FIG. 4, the present embodiment has a detection member 25 for detecting the position of every 90 degrees of the rotating operation portion 3, and also has an LCD driver 26, which stores the data inputted for displaying letters on the LCD 4, generates data for displaying the letters by rotating them (by 0, 90, 180 or 270 degrees) on an X-Y matrix according to a detection of every 90 degrees by the detection circuit 25, and then transmits the data to the LCD 4.

The detection circuit 25 is composed of a rotor 30 which rotates in accordance with the rotation of every 90 degrees of the hollow rotor 15, and switches SW1, SW2, SW3 and SW4 which touch the projection of the rotor 30 alternately, every 90 degrees (0, 90, 180 or 270 degrees), and whose ON-state signals the LCD driver 26 takes in.

The switches SW1 through SW4 may be mechanical ones which is turned on by touching the projection of the rotor 30, or optical ones which is turned on by the projection of the rotor 30 interrupting beams. Or they may be magnetic ones or the like.

Next, the motion and function of the present embodiment will be explained.

In FIGS. 1 through 4, when transmitting, a user puts an original on the insertion slot 1, and transmits it by operating the numerical keys 7 and the start key 9 on the operation portion 3. The contents according to the operation of the keys on the operation portion 3, is displayed in the LCD 4. And when receiving, the apparatus works like conventional facsimile apparatuses, ejecting printed paper out of the ejection slot 2.

In such a motion, the horizontal direction the apparatus faces will be changed so that the apparatus will fit in the place where it is situated. In case of the direction of the apparatus shown in FIG. 1 suppose it to be 0 degree, the ejection slot 2 faces a user. In this case, the user will rotate the rotating operation portion 3 every 90 degrees, and settle it so that he can easily read the letters and the like on the keys ("0" to "9", "*" and "#" on the numerical keys 6; "A", "B" and "C" on the function selection keys 7; "STOP" on the stop key 8; "START" on the start key 9).

In accordance with the rotation of the rotating operation portion 3, the rotor 30 of the detection circuit shown in FIG. 4 will rotate, and the projection of the rotor 30 will touch the switch SW1 and turn it on. The ON-state signal will be taken in by the LCD driver 26. The LCD driver 26 will rotate the image of inputted letters when displaying it on an X-Y dot matrix ,in this case, in the normal position of 0 degree, transmit the display data to the LCD 4 shown in FIG. 1, and display the letters.

In FIG. 1, letters "START" are displayed on the LCD 4 so that their running direction will enable the user facing the insertion slot 2 to easily read or recognize them. In this case, the LCD 4 may display the image at any arbitrary angle in accordance with the rotation of the rotating operation portion 3, but it is recommended that the display image should be rotated by 90 degrees when the rotating operation portion 3 rotates by 45 degrees, so that the display control will not be complicated. Thus, the image is displayed in any of the four directions, and will be rotated by 90 degrees when the rotating operation portion 3 rotates by ±45 degrees or more. And then the apparatus will be easily controlled and easy to handle.

FIG. 5 is a top view of the apparatus in case of situating it with its rotating operation portion 3 forward. In FIG. 5, the insertion slot 1 is on the right side, and the ejection slot 2 is on the left side, of the apparatus in a user's eyes. In this case, the user will rotate the rotating operation portion 3 by 90 degrees from the position shown in FIG. 1, and settle it so that he can easily read the names of the keys.

In accordance with the rotation of the rotating operation portion 3, the rotor 30 of the detection circuit 25 shown in FIG. 4 will rotate by 90 degrees, and the projection of the rotor 30 will touch the switch SW2 and turn it on. The ON-state signal will be taken in by the LCD driver 26. The LCD driver 26 will rotate the image of inputted letters when displaying it on an X-Y dot matrix (in this case, in the position of 90 degrees), transmit the display data to the LCD 4 shown in FIG. 1, and display the letters on the dot matrix. As a result, as shown in FIG. 5, the letters "START" on the LCD 4 are displayed so that their running direction will enable the user facing the rotating operation portion 3 to easily read them, that is, are displayed by rotating them by 90 degrees from the position shown in FIG. 1.

Figure 6:
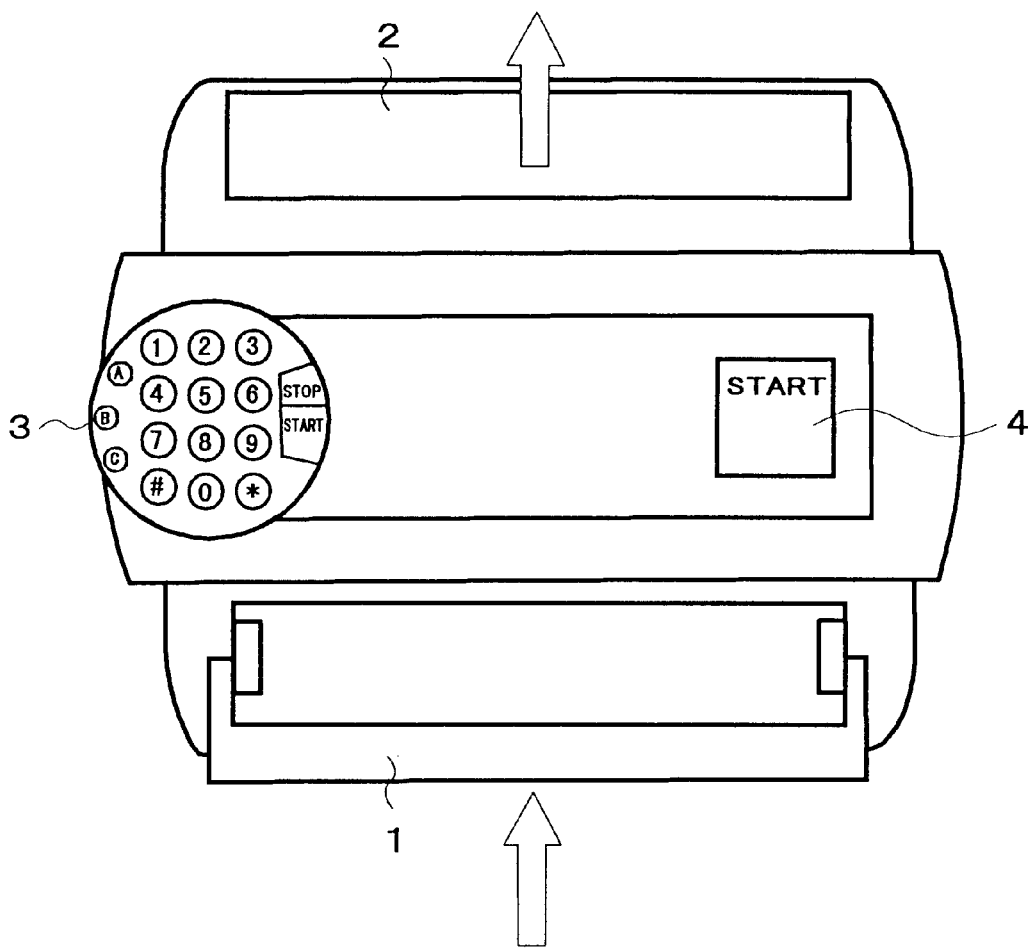
FIG. 6 is a top view of the present facsimile apparatus, in case of situating it with its rotating operation portion leftward.

FIG. 6 is a top view of the apparatus in case of situating it with its rotating operation portion 3 leftward. In FIG. 6, the insertion slot 1 is the nearest to a user. In this case, the user will rotate the rotating operation portion 3 by 180 degrees from the position shown in FIG. 1, and the projection of the rotor 30 will touch the switch SW3. As a result, the names of the keys on the rotating operation portion 3 can be easily read, and the letters on the LCD 4 will be displayed by rotating them by 180 degrees from the position shown in FIG. 1, so that the user facing insertion slot 1 can easily read them.

Figure 7:
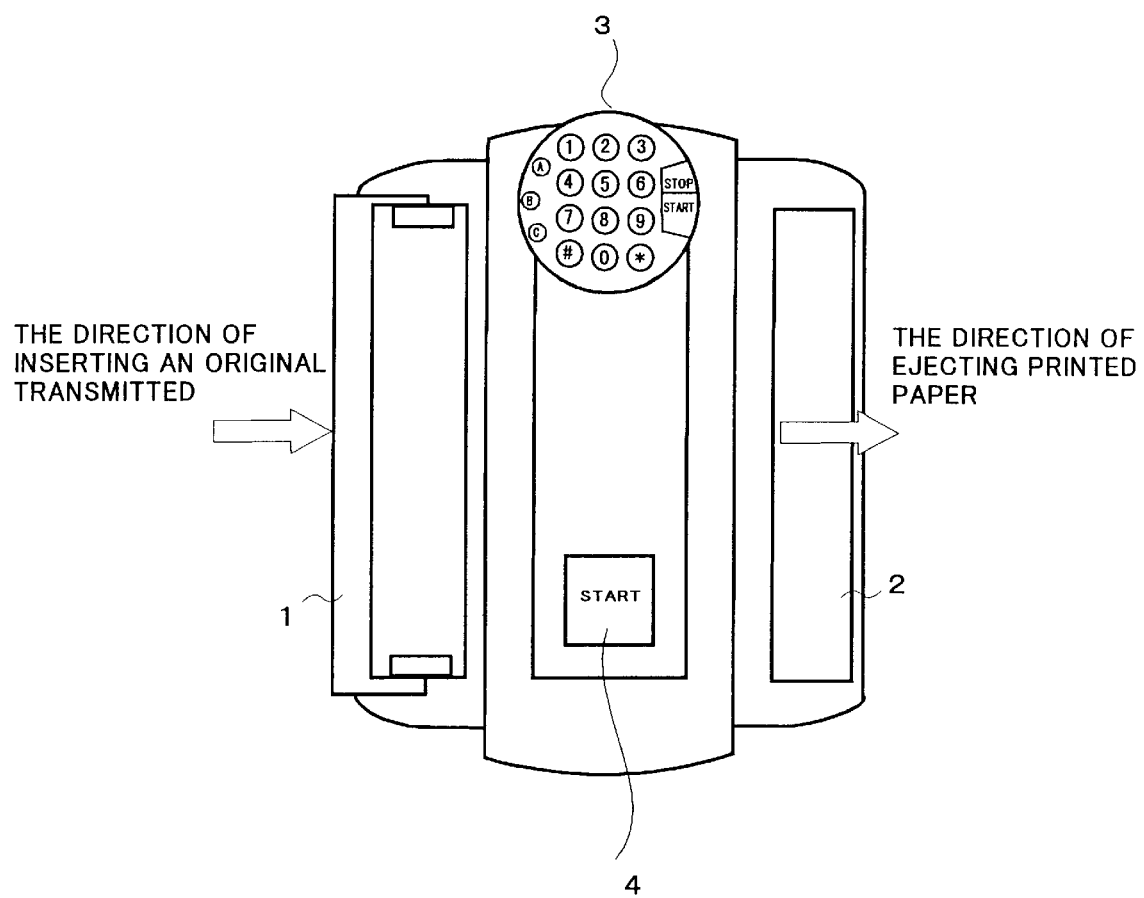
FIG. 7 is a top view of the present facsimile apparatus, in case of situating it with its rotating operation portion backward.

FIG. 7 is a top view of the apparatus in case of situating it with its rotating operation portion 3 backward. In FIG. 7, the LCD 4 is the nearest to a user. In this case, the user will rotate the rotating operation portion 3 by 270 degrees from the position shown in FIG. 1, and the projection of the rotor 30 will touch the switch SW4. As a result, the names of the keys on the rotating operation portion 3 can be easily read, and the letters on the LCD 4 will be displayed by rotating them by 270 degrees from the position shown in FIG. 1, so that the user standing in the lower part of the figure can easily read them.

In the present embodiment, the apparatus rotates letters on the LCD 4 in accordance with the rotation of the rotating operation portion 3. In other words, the apparatus rotates the letters electrically and displays the image of them. Alternatively, the LCD 4 itself may be rotated mechanically. In this case, it is suggested that the LCD 4 itself should be rotated mechanically by transferring the rotation of the rotating operation portion 3 through a belt, gears or the like.

As is apparent through the above explanation, the present invention provides a facsimile apparatus whose operation portion and display are both conspicuous and which can be easily operated, regardless of which side an operator stands on.

In the concrete, the apparatus is easier to operate because its operation panel and display both face the operator regardless of which side he stands on. In addition, the image is displayed in any of the four directions and will be rotated by 90 degrees when the rotating operation portion 3 rotates by ±45 degrees or more, and hence the apparatus will be easily controlled and easy to handle. Furthermore, since its operation portion can be easily rotated by the operator standing on a side of the apparatus, the apparatus is even easier to handle. And furthermore, since its insertion slot and ejection slot are arranged symmetrically centering the operation panel, the apparatus is still easier to operate.

What is claimed is:

1. A facsimile apparatus comprising:

an operation panel that operates said facsimile apparatus, wherein said operation panel is arranged horizontally and is rotatable; and a display portion that displays symbols, wherein said display portion is arranged at a same level as said operation panel and rotates a displayed symbol in accordance with the rotation of said operation panel, said display portion being fixedly positioned, said facsimile apparatus is configured vertically, and said operation panel and said display portion are arranged at the top level of said facsimile apparatus, between a paper feeder and a paper ejector, each of which feeds or ejects paper in a direction crossing said top level at an obtuse angle.

2. The facsimile apparatus according to claim 1, an orientation direction of said displayed symbol being changed electrically in accordance with rotation of said operation panel.

3. A facsimile apparatus which at least one of transmits an image of an original and prints a received image, said apparatus comprising:

a housing having an upper surface;

a panel rotatably mounted on said upper surface of said housing, said panel having a round planar surface on which a plurality of keys are provided, said panel being positioned such that a portion of an outer circumferential surface of said panel projects outside of an edge of the upper surface of said housing.

4. The facsimile apparatus according to claim 3, said housing including a recessed portion on a sidewall adjacent a location where said panel is rotatably mounted, said recessed portion being defined by said housing having a concavity that is positioned to intersect a surface of said panel.

5. The facsimile apparatus according to claim 3, said plurality of keys comprising keys for controlling image transmission, including a ten key numeric pad, a start key and a stop key.

6. The facsimile apparatus according to claim 3, said apparatus further comprising a display, provided on the upper surface of said housing and distinct from said panel, said display displaying a character corresponding to an operation of a key of said plurality of keys of said panel.

7. The facsimile apparatus according to claim 6, said panel being rotatable with respect to said display.

8. The facsimile apparatus according to claim 6, said display having a quadrilateral shape.

9. The facsimile apparatus according to claim 6, further comprising a controller which changes an orientation direction of the character displayed on said display in association with rotation of said panel so that an orientation direction of said character displayed on said display corresponds with an orientation direction of a legend of said plurality of keys of said panel.

10. The facsimile apparatus according to claim 9, wherein, upon said panel rotating by at least 45°, said controller changes the orientation direction of a character displayed on said display by 90° to orient said character in a same direction as the orientation of said plurality of keys.

11. The facsimile apparatus according to claim 10, said controller comprising:

a position detection circuit which detects in which of four 90° zones said panel is oriented; and a display driver which changes the orientation direction of a character displayed on said display to match an orientation direction of a detected zone.

12. The facsimile apparatus according to claim 11, said position detection circuit detecting a position of said panel at 90° intervals.

13. The facsimile apparatus according to claim 11, said position detection circuit including a rotor which rotates in association with rotation of said panel.

14. The facsimile apparatus according to claim 3, said apparatus further comprising:

a display positioned on the upper surface of said housing spaced from said panel, said display displaying a character corresponding to an operation of a key of said plurality of keys; and a mechanism which changes an orientation direction of the character in association with rotation of the panel so that an orientation direction of the character displayed on said display matches an orientation direction of a legend of the plurality of keys of said panel.

15. The facsimile apparatus according to claim 3, further comprising a paper insertion system and a paper ejection system, said panel being positioned between said insertion system and said ejection system.

* * * * *